(12) United States Patent
Johnson et al.

(10) Patent No.: US 7,928,831 B1
(45) Date of Patent: Apr. 19, 2011

(54) SYSTEM AND METHOD FOR HANDLING USER KEYS AND USER PASSWORDS IN A TAGGING SYSTEM WHERE THE TAG ITSELF IS CAPABLE OF CARRYING ONLY A SINGLE KEY OR PASSWORD

(75) Inventors: Charles A. Johnson, Albuquerque, NM (US); Colin Watt, Alburquerque, NM (US)

(73) Assignee: TC License Ltd., Hummelstown, PA (US)

( * ) Notice: Subject to any disclaimer, the term of this patent is extended or adjusted under 35 U.S.C. 154(b) by 867 days.

(21) Appl. No.: 11/502,628

(22) Filed: Aug. 11, 2006

Related U.S. Application Data (60) Provisional application No. 60/707,180, filed on Aug. 11, 2005.

(51) Int. Cl.
*H04Q 5/22* (2006.01)

(52) U.S. Cl. ........................................ 340/10.1

(58) Field of Classification Search .................. 340/10.1, 340/825
See application file for complete search history.

(56) References Cited

U.S. PATENT DOCUMENTS

| | | | | |
|---|---|---|---|---|
| 6,873,260 B2 * | 3/2005 | Lancos et al. | ............... | 340/573.1 |
| 6,980,087 B2 * | 12/2005 | Zukowski | .................. | 340/10.51 |
| 2005/0036620 A1 * | 2/2005 | Casden et al. | ................ | 380/259 |
| 2005/0061875 A1 * | 3/2005 | Zai et al. | ....................... | 235/383 |
| 2008/0109897 A1 * | 5/2008 | Moran et al. | .................... | 726/19 |

* cited by examiner

*Primary Examiner* — Brian A Zimmerman
*Assistant Examiner* — Sara Samson
(74) *Attorney, Agent, or Firm* — Caesar, Rivise, Bernstein, Cohen & Pokotilow, Ltd.

(57) ABSTRACT

In railroad uses or the like, a transponder having a single key for transactions is accessible through a reader/programmer to multiple users or owners. The reader/programmer receives a transaction request and determines whether the user or owner is authorized for that transaction. If so, the reader/programmer generates the key on the fly and performs the transaction.

37 Claims, 3 Drawing Sheets

SYSTEM AND METHOD FOR HANDLING USER KEYS AND USER PASSWORDS IN A TAGGING SYSTEM WHERE THE TAG ITSELF IS CAPABLE OF CARRYING ONLY A SINGLE KEY OR PASSWORD

REFERENCE TO RELATED APPLICATION

The present application claims the benefit of U.S. Provisional Patent Application No. 60/707,180, filed Aug. 11, 2005, whose disclosure is hereby incorporated by reference in its entirety into the present disclosure.

FIELD OF THE INVENTION

The present invention is directed to a technique for encryption and authentication with a transponder and more specifically to such a technique in which multiple users and owners can interact with a transponder without the need to support a user/key table in either the transponder or the reader.

DESCRIPTION OF RELATED ART

A transponder is an electrical device that receives a specific signal and automatically transmits a specific reply. A transponder can also be designed with the ability to have data written into its memory.

The word "transponder" comes from "transmitter and responder." In the RFID industry, transponders are often simply referred to as "tags."

Transponders are often used in transportation, for such purposes as collecting tolls and tracking vehicle movement. For example, a transponder can be attached to a railroad car, and a reader can be mounted by a railroad to interrogate an expected transponder on each passing train and thereby to track the movements of railroad cars equipped with the transponders.

A second generation of transponders for railroads has been proposed. AT5118 MRD lists requirements for the new generation of rail tags. These tags are to utilize the so-called "Trinity" ASIC (application-specific integrated circuit), which will be described below. Thus, a reader designed to work with the second generation of tags should be able to operate with the Trinity ASIC. Included in the MRD are tag programming and security requirements, some of which are as follows.

The six class-one railroads can program and protect their own tags, including the AAR frame and the key, using only a specifically authorized RF tag programmer.

A class-one railroad (A) can give permission to another class-one railroad (B) such that (B) can program a tag for (A), including only the AAR frame and the key, using only a specifically authorized RF tag programmer, and the tag will then appear to be a tag belonging to (A).

A class-one railroad (A) can give permission to its customers (C) such that (C) will have permission to program data into the tags belonging to (A), including only data into assigned user memory locations as authorized by (A), using only a specifically authorized RF tag programmer.

A class-one railroad must be able to have the keys changed in its own tags in the event that they think the security system has been compromised.

The Trinity ASIC is an ultrawideband (UWB) transceiver chipset which uses a set of three keys to protect data in the tag. The keys are titled Master Key, Key 1, and Key 2.

The Master Key is to be used to protect configuration data programmed at the factory. The Master Key is normally not to be used while the tag is deployed into general use.

Key 1 and Key 2 are to be used while the tag is deployed into general use. Normally only Key 1 will be utilized. Key 2 is to be used in the event that Key 1 needs to be changed.

Key 1 is used to access the tag's memory, for the purpose of reading and writing data to the tag's general user memory. Key 2 provides access to Key 1 only, allowing Key 1 to be changed.

While the Trinity ASIC will have one key that is used to access (read and write) the general user memory, multiple users would like to have separate keys to access defined parts of general user memory. The Trinity ASIC itself does not offer that capability. There is also the difficulty of ensuring the integrity of data across the system when a single key is compromised. While each reader or programmer could include a tag/key table to implement such capability, the management of such a table in each reader or programmer would be burdensome. Also, supervisors may need to protect the same memory space using multiple keys and may need to minimize the effort of managing the keys themselves.

SUMMARY OF THE INVENTION

It will be seen that a need exists in the art to provide multiple users with separate keys while avoiding the aforementioned difficulties.

It is therefore an object of the invention to have different keys in each tag so that compromising one key does not compromise one user's entire set of data.

It is another object of the invention not to have large tag/key tables in each reader/programmer, to avoid the constant management of tag/key tables.

To achieve the above and other objects, the present invention is directed to a security implementation that locates the operational complexity in the reader instead of the tag without the need for a tag/key table. Each reader and programmer is programmed to implement a supervisory algorithm that uses the tag's single key to control access to the tag and that provides a "multiple key" interface to the users. The implementation allows both separate "keys" to protect separate memory spaces and/or multiple "keys" to protect common memory spaces.

The combination of a single-key implementation in the tag and a multiple-key implementation in the reader provides the following advantages. The tag requires much less memory and much less supporting hardware. Both power consumption and time to execute transactions are reduced. A significant cost saving is realized in the tag.

Railroads were to begin using Gen II rail tags which contain the Trinity ASIC. Railroads did not want to manage a huge data base of tag IDs and keys. The present invention allows the immediate benefit of the utilization of tag keys in the railroads tags without either a tag vendor or the railroads (or anyone for that matter) having to manage the keys in the tags. An added benefit of the scheme is that it also provides the opportunity for simulating multiple keys protecting separate spaces in the tag, which is a future requirement of the railroads.

The advantages of key management supported in the reader/programmer are many. Users do not have to manage large databases of keys. Keys are not passed from site to site for use by multiple users. Keys are not stored in disparate data bases. Generating and using keys becomes invisible to the user. The whole authentication process can be automated.

The advantages of a single key implementation supported in the tag and a 'multiple key' implementation supported in the programmer are many. Much less memory is required in the tag. Much less supporting hardware is required in the tag. Power consumption per transaction is reduced. Time to execute transactions is reduced. A significant cost saving is realized in the tag.

The following definitions are to be used throughout the present disclosure, including the claims.

AAR Frame—Any data frame in a tag used to represent the 128-bit ATA/ISO/AAR data frame format used in the current rail tag, or any equivalent in any other tag.

Authentication—A process undertaken between a programmer and a tag, using a master key or a user key (1 or 2), to verify that the proper key value is held in both the programmer and the tag. After this process, the tag will allow the programmer to execute reads and writes to protected space.

Class I Railroad—Any of the six major railroad companies operating in the United States, or any equivalent elsewhere.

CRC—Cyclic Redundancy Check.

Host—Or "host system," computer equipment attached to the reader/programmer serial interface, which commands and controls the reader/programmer.

Key—A 96-bit key used as a password to control reading and writing operations in the Trinity ASIC. Types of keys are the Master Key, Key 1, and Key 2, described above. The word "key" also includes any equivalent keys in any other circuitry used in a tag.

Password—A general user-friendly word for "key."

Programmer—A reader (TransCore A1411013 or any equivalent), that has the capability for writing data into a tag.

Reader—A device (TransCore Radio Interrogator A1411013 or any equivalent) that has the capability for reading data from a tag.

BRIEF DESCRIPTION OF THE DRAWINGS

A preferred embodiment and variations thereon will be disclosed in detail with reference to the drawings, in which.

DETAILED DESCRIPTION OF THE PREFERRED EMBODIMENT

A preferred embodiment of the present invention and variations thereof will be set forth in detail with reference to the drawings, in which like reference numerals refer to like elements throughout.

Figure 1:
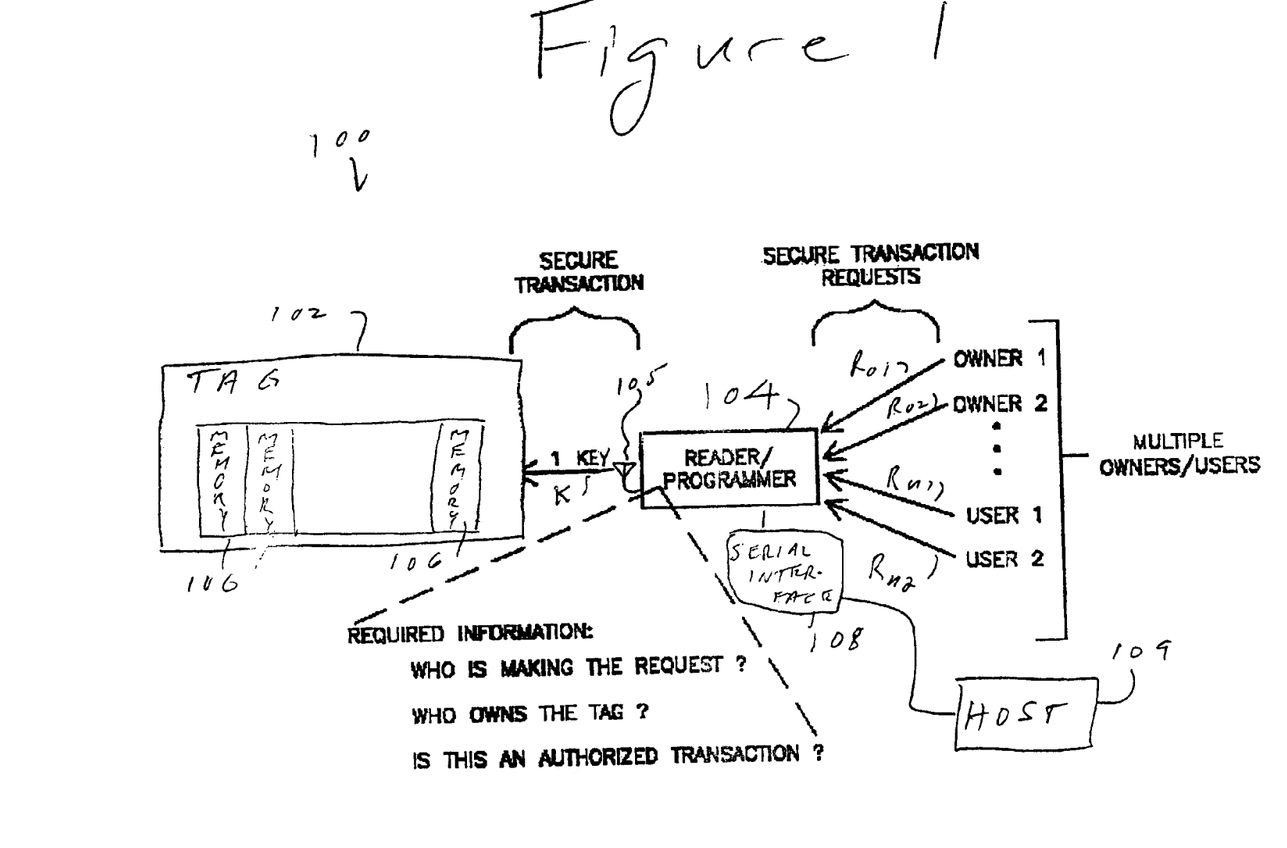
FIG. 1 shows a high-level block diagram of a system in which the preferred embodiment is implemented.

FIG. 1 shows a high level diagram of the system 100, system signals, and user perceptions. The tag 102 is any tag in the system, which can appear at any time in the read zone of any reader or programmer 104. Each tag 102 will have only one key K that can be used to operate on or access the capabilities of the tag 102.

The reader/programmer 104 is the device that is to perform the requested secure transactions with the tag 102. The reader/programmer 104 communicates with the tag 102 through an RF antenna 105. The transactions can be encrypted in any suitable form using the key K, e.g., CRC.

Multiple owners and users are allowed to make various secure transaction requests RO1, RO2, . . . , RU1, RU2, . . . that the reader/programmer 104 will execute on the tag 102. Each request is to be associated with a specific portion of memory 106 in the tag 102 and will have a required set of required information associated with the transaction.

The reader/programmer 104 includes a serial interface 108 (or other suitable interface, such as USB) for communication with a host 109.

Key Generation

To avoid the need for a tag/key table in either the tag 102 or the reader/programmer 104, the preferred embodiment implements a process for determining and generating the key K stored in the tag 102 in real time (i.e., on the fly).

If each tag 102 is to have a different key K, and the keys are not stored in any database on the reader/programmer 104 or the host system, then the key K is generated by the reader/programmer 104 from data contained in the tag 102. Each time a transaction is requested, the reader/programmer 104 will be required to run an algorithm to generate the key K using the data from the tag 102. In this case, the data used would be the unique ID of the tag 102 and possibly any other data stored in the tag 102 that is guaranteed never to change.

To allow the changing of the algorithm, and the changing of keys K for a particular tag 102, the algorithm is seeded using information acquired from data stored within the authorized reader/programmer 104 or from the transaction request. The reader/programmer 104 generates the tag key K only after determining that the transaction is an authorized transaction.

Each time a secure transaction (requiring Authentication) is requested, the Programmer will be required to run the algorithm to generate the User Key 1.

To allow the changing of the User Key 1 for a particular Tag, the algorithm residing within the authorized Programmer can be changed, a new User Key 1 generated, and the new User Key 1 can be stored in the Tag.

To allow the changing of the User Key 1 Generator Algorithm residing within the Programmer, the algorithm can be physically changed through algorithm replacement, adjusting generator polynomials, changing terminal clock values, seeding differently, or changing tag stored data.

The Programmer will generate the User Key 1 only after determining that the transaction is an authorized transaction.

Transaction Authorization

All Programmers will be capable of performing all possible transactions on any Tag. Transactions that will actually be performed by a Programmer will be temporarily enabled within the Programmer. Temporary enabling of the transactions can be done through sending enabling information in messages to the Programmer through its serial communications port or by reading the enabling information from a special tag called a Permissions Tag.

It is possible to control that type of operation within the reader/programmer if three pieces of data are available to the reader/programmer. They are:

Who is making the request?

Who owns the tag?

Is the transaction an authorized transaction?

Information pertaining to who owns the tag 102 can be acquired from the tag 102 itself (or from the host 109 if the tag 102 is blank). Depending on which of either of two methods are used, the other two pieces of information can be obtained from either the data stored within the authorized reader/programmer 104 or from the transaction request. Both methods are described in the following two sections.

Method 1: Limited Processes per Programmer/Reader

Figure 2:
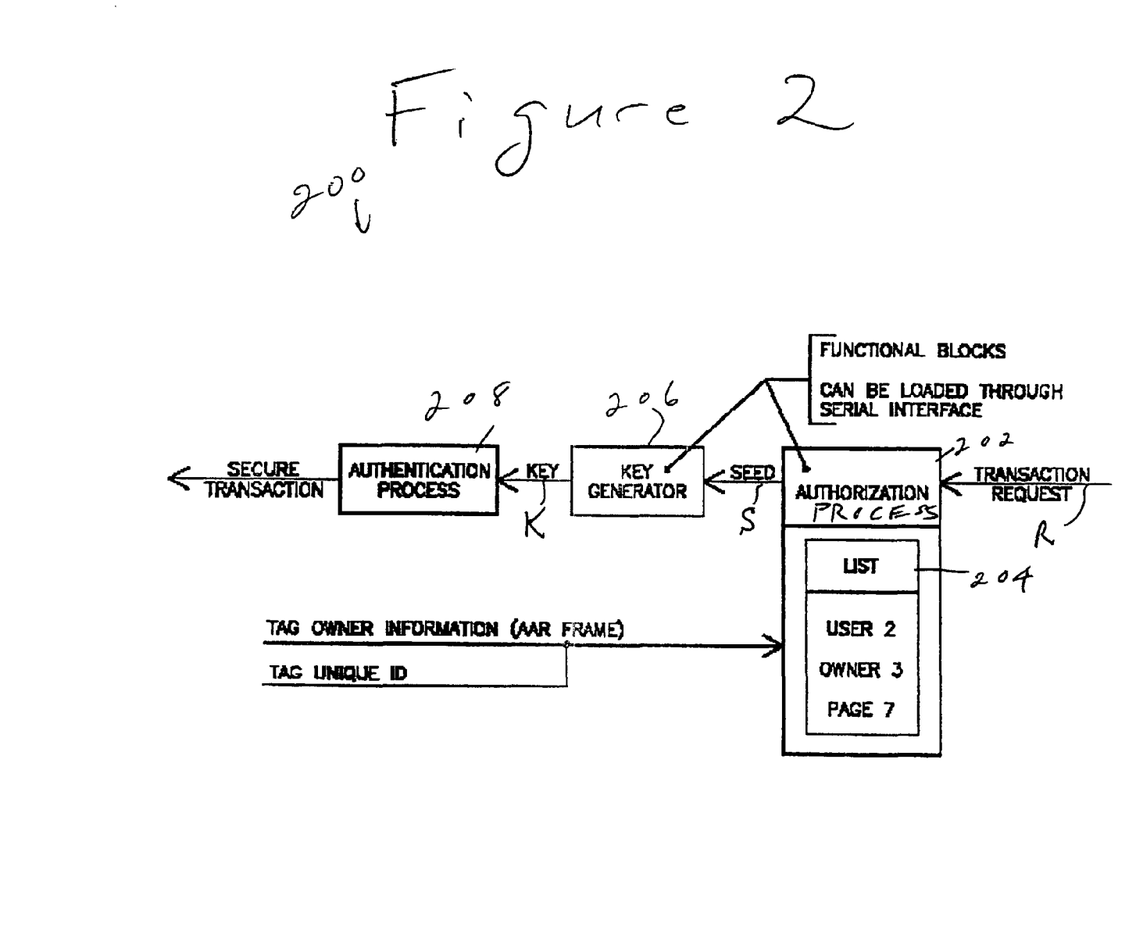
FIGS. 2 and 3 show two methods of transaction authorization that can be performed in the system of FIG. 1.

FIG. 2 shows an intermediate level diagram of the authorization/authentication processes 200 that would be contained within the reader/programmer 104 shown in FIG. 1. The basic concept in this method is that each reader/programmer 104 that is in general use would have capabilities enabled, by the authorization being held in a list, within that device. Those capabilities would be authorized to the holder/user of the reader/programmer 104 and be specific to the transactions that the holder/user is authorized to perform.

In FIG. 2, the transaction request R is a request (shown in FIG. 1 as RO1, RO2, ..., RU1, RU2, ...) sent to any reader/programmer 104. The authorization process 202 compares the requested transaction with its internally stored list 204 of authorized processes and determines whether it is authorized to perform the requested transaction. In the example shown, the reader/programmer 104 is authorized to perform authenticated write transactions, as user 2, on owner 3 tags, to the data space named page 7. Any reader/programmer 104 can be authorized to perform any number of transactions.

If the transaction requested is authorized, the process uses seeding information S from multiple sources to seed its key-generation algorithm 206 in such a fashion as to generate the correct key K for use in performing the secure transaction with the tag. In the example shown, the tag owner, tag unique ID, and programmer user information are used as the seeding information S to seed the algorithm 206 in such a fashion that the correct key K is generated.

Once the key K is generated, it is passed to the partition 208 of the reader/programmer 104 that performs the authenticated transaction using the (already described) Trinity ASIC key implementation. Methods for enabling multiple user access are independent of the security key implementation in the Trinity ASIC. If a transaction is requested that is not in the reader/programmer stored list 204 of authorized transactions, the transaction will be attempted without the generation of a key K and will either succeed or fail normally.

If a transaction is requested that is not in the Programmer stored list of authorized transactions, the transaction will be attempted without the generation of a User Key 1 and will either succeed or fail normally.

Using this method would require that the tag vendor produce Permissions Tags or coded messages (of enabling information) and control their distribution. The Users of the Programmers would be obligated to protect the Permissions Tags or coded messages from being misused.

From this point on in this discussion, the enabling information and/or the Permissions Tag will be referenced by the physical entity called the 'Permissions Tag'. The physical entity, the Permissions Tag, is the method of choice to be used by the Railroads but may not necessarily be that used by other customers or in other markets.

In the event that misuse of the reader/programmer 104 is detected, either the unit would be recalled, or a new authorization process 202 and/or key generator code set 206 would be downloaded into the existing set of reader/programmers. As shown in FIG. 1 and as noted above, the reader/programmer 104 includes a serial interface 108 for such downloading. Of course, any other suitable interface, such as USB, can be used instead. The new load would effectively change the key K on any accessible tags 102 by generating a different algorithm seed S and/or using the different key generator 206 to generate the new keys K for the tags 102 affected by the compromised process.

To perform an effective wholesale change of the generated User Key 1's stored in the Tags, new Permissions Tags would be issued. These Permissions Tags would contain new data, which would trigger the use of a different algorithm for generating and replacing the User Key 1s in any available tags. Old Permissions Tags would be collected or allowed to expire.

In severe cases of process compromise, a new Authorization Process and/or Key Generator code set would be downloaded into the existing set of Programmers. The new load would effectively change the User Keys 1 on any accessible Tags by using a different Key Generation Algorithm.

Method 2: Capability Codes Authorize Processes

Figure 3:
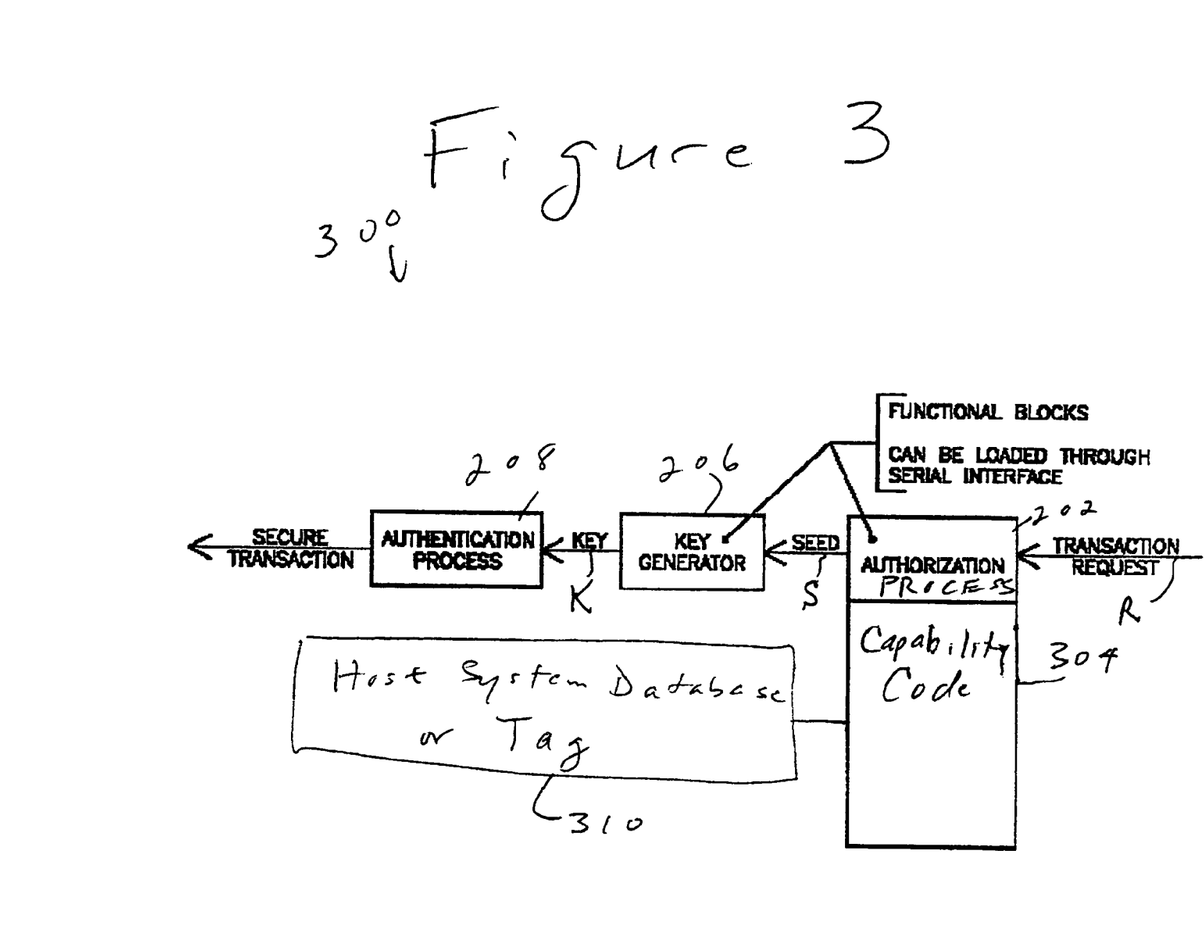

The basic concept in the second method is that each reader/programmer that is in general use would have the inherent ability to perform any transaction. The method 300 shown in FIG. 3 is functionally equivalent to that shown in FIG. 2, except that the authorized transactions would not be stored in a list 204 (which is therefore omitted from FIG. 3). Instead, the capabilities would be enabled within the reader/programmer 104 through the use of capability codes 304.

Capability codes 304 would be generated as a large number, of which only a few can be authenticated and thus can be assigned for actual use, similar to the common credit-card number. Encoded in the capability code 304 would be all of the information particular to the authorized transaction(s). The reader/programmer 104 would be able to authenticate the capability code 304 and then perform the requested transaction.

A capability code 304 would be issued to the users of the reader/programmer 104. The capability codes 304 could be conveniently stored for the user by any number of methods. For example, they could be:

1. Stored by the user in his host system database for use with a programmer/reader, or 2. Programmed into a special tag or credit-card-shaped tag for insertion into a slot in the programmer's antenna housing, or 3. Programmed into a special tag for reading by the programmer prior to performing a transaction.

The various storage media disclosed above are collectively shown in FIG. 3 as 310. Of course, those skilled in the art who have reviewed the present disclosure will readily appreciate that other storage media can be used within the scope of the method of FIG. 3.

The capability code 304 would authorize a particular transaction when made available to the reader/programmer 104 at the time of the transaction request.

Capability codes 304 could be generated that would have a limited lifetime. This feature could be used to require users to periodically renew their authorization for use of capability codes 304 specific to their particular transactions.

A central location could produce the capability codes and control their distribution. For example, card tags could be produced and distributed only to class-1 railroads. The recipients would be obligated to prevent misuse of the capability codes.

In the event that misuse of the capability code 304 is detected, a new authorization process and/or key generator code set would be downloaded into the existing set of reader/programmers 104, as described above. The new load would reject the old capability codes 304 and effectively change the keys K on any accessible tags 102 by generating the new keys K for the tags 102 affected by the compromised process.

A SeGo (memory password) implementation will now be described. The SeGo ASIC uses a set of three keys to protect data in the Tag. The keys are titled Master Key, User Key 1, and User Key 2.

The Master Key is to be used to protect configuration data programmed at the factory. The Master Key is normally not to be used while the Tag is deployed into general use.

User Key 1 and User Key 2 are to be used while the Tag is deployed into general use. Normally only User Key 1 will be utilized. User Key 2 is to be used in the event that User Key 1 needs to be changed.

User Key 1 is used to access the Tag's memory, for the purpose of reading and writing data to the Tag's general User memory. User Key 2 provides access to User Key 1 only, allowing User Key 1 to be changed.

Authorization and Validation of Permissions Tags

Along with the information stored in the Permissions Tags would be extra information, a Validation Code combined with the Mutual Authentication processes already in the Tag, the Validation codes would allow the Programmer to Validate/Authenticate the Permissions Tag itself.

Validation Codes would be generated as a large number (which may be realized as a collection of disparate information in the Permissions Tag) of which only a scarcity can be authenticated through the running of independent algorithms. Encoded in the Validation Code would be all of the information needed to authenticate the Permissions Tag.

After validation of the Permissions Tag, the authorized transactions are loaded into the list space in the Programmer.

Validation Codes could be generated that would have a limited lifetime. This feature could be used to require Users to periodically renew their Permissions Tags for enabling the particular transactions in their Programmers.

Using this method would require that the tag vendor produce the Permissions Tags and control their distribution (e.g. distribute Permissions Tags only to Class 1 Railroads). The Users of the Programmers would be obligated to protect the Permissions Tags from being misused.

In the event that misuse of the Permissions Tag is detected, a new Authorization Process and/or Key Generator code set would be downloaded into the existing set of Programmers. The new load would reject the old Permissions Tags, and effectively require the use of a newly issued Permissions Tag.

Key Generation

User 1 Key Generator

This section describes how the User Key 1 generator in the Programmer may work.

User Key 1 generation is easily enabled in all standard issue Programmers. This is done using a Permissions Tag that enables an algorithm that operates on data read from the Permissions Tag and the Tag being programmed.

As an example, the Gen II Rail key generation algorithm works as follows: The algorithm is realized as a 96 bit linear feedback shift register. The Algorithm Number from the Permissions Tag points to one of a series of registers in the Programmer in which is stored the Generator Polynomial. The 96 bit Seed in the Permissions Tag is used to initialize the shift register. The Clock Count (greater than 192 decimal) in the Permissions Tag is used to clock the shift register. While clocking the shift register, the 64 bit Tag Unique ID is concatenated with the 32 bit Key Maintenance Data, both from the Tag being programmed, and used as the input to the shift register. The Tag Unique ID concatenated with the Key Maintenance Data is used in circular fashion at the input so that in cases where Clock Count exceeds 193 decimal the input does not degrade to all zeros or ones. The last 96 bits of the output, at the expiration of Clock Count, is the User Key 1 for the Tag being programmed.

User 2 Key Generator

This section describes how the User Key 2 generator in the Programmer works.

All User Key 2 functions must be performed through a vendor-managed effort to perform User Key 2 functions in the field. The vendor-managed field effort will be to enable the User Key 2 generation capability in the Programmers.

Enabling User Key 2 generation in the programmer will be performed using the Permissions Tag. Once enabled in the Programmer, every tag encountered will automatically have its User Key 1 updated to the New User Key 1 using the User Key 2.

When User Key 2 generation is enabled in the standard issue Programmer, it is done in a similar fashion to that of the generation of User Key 1. A special short-lived Permissions Tag is distributed containing a Seed, Algorithm Number, and Clock Count that is used specifically for the User Key 1.

In the event that the set of User Key 2s being used needs to be changed in the Tags, this function must be performed by sending the Tags back to the Factory where the Master Key is known and can be used to change the User Key 2.

Permissions Tag Scheme

General Permissions Tag

For the Programmer to become enabled to perform Specific Transactions the Programmer must read the Permissions Tag.

The Permissions Tag is capable of enabling specific Transactions for a limited amount of time.

Turning the Programmer off will cause the loss of all Permissions Tag information and the Programmer will loose the capability for performing the Specific Transactions. The permissions Tag can be configured to allow the Programmer to retain Permissions information across a power outage.

Reading a new Permissions Tag will cause the loss of all previous Permissions Tag information and cause the acquisition and storing, within the Programmer, of new Permissions Tag information.

A Single Permissions Tag has the capability of authorizing transactions on a single Owner's Tags.

Legacy Security Characters

The Legacy ATA/AAR Security character scheme must be supported with the new Programmers.

In the AP4110 Programmer, the Security Character information is held in the Programmer and the Programmer enforces the use of only those Security Characters in tag programming operations.

For the new Programmer, the Security Character information is held in the Permissions Tag. Each time a Permissions Tag is presented to the Programmer, the Security Character information is read from the Permissions Tag and loaded into the Programmer. After reading of the Permissions Tag, the Programmer will then be able to program the authorized Security Characters into the AAR data space of the Tag.

User Key 1 Information

All Permissions Tags contain information for the generation of the User Key 1. This includes the Algorithm Number, Seed, and Clock Count.

User Key 2 Information

First issue Permissions Tags will not contain information for the generation of the User Key 2. Only after it is determined that the User Key 1s in all tags need to be changed will Permissions Tags be issued that contain information for the generation of the User Key 2.

All second issue and beyond Permissions Tags contain information for the generation of the User Key 2. This includes the Algorithm Number, Seed, and Clock Count. Presence of this information in the Permissions Tag will cause the Programmer to execute the Authentication Attempt in such fashion as to change the current User Key 1 in the tag to the (new) User Key 1 generated by using the User key I information in the Permissions Tag.

Valid Transactions

Information will be included to indicate which transactions are valid and authorized by the Permissions Tag. This will include the Tag Owner ID and a Data Space Map. These two items will be associated with each other by their being stored together as a single record. There may be multiple of these records in any one Permissions Tag.

The Tag Owner ID will indicate which Owner's tag can be operated on, and the Data Space Map will indicate on which bytes in the Tag the Programmer is authorized to perform authenticated transactions.

Permissions Tag Validation Information

Each Permissions Tag contains information that allows the Programmer to uniquely identify it as a Permissions Tag.

To read and validate a permissions tag, the Programmer must perform a specific sequence of steps. The settings from a permissions tag must never be applied until the entire validation process is completed successfully. The required steps include:

1 Reading specific signature characters from tag memory.
2 Calculating and checking CRCs from tag memory.
3 Successfully running Key Generation algorithms for the Permissions Tag.
4 Enter mutual authentication with the permissions tag.
5 Read protected data.

Permissions Tag Expiration Date

The Permissions Tag contains an Expiration Date that causes the Programmer to not use the information in the Permissions Tag after the Expiration Date Passes. This effectively retires the Permissions Tag after the Expiration Date and any Programmer that reads this Permissions Tag will not perform Authenticated Transactions operating as a normal Programmer.

Permissions Tag Owner ID

Each Permissions Tag contains information that allows the Programmer to uniquely identify the owner of the Permissions Tag. This is used by the Programmer to put the owner's identity into each tag to identify who programmed the tag.

Permissions Tag Timeout

The Permissions Tag will contain information that sets a timer in the Programmer. At the expiration of the timer, all Permissions Tag information in the Programmer is lost, Specific Transaction capability is lost, and the Programmer becomes a normal Programmer. The Permissions Tag can be configured to allow the Programmer to retain Permissions information for an infinite time period.

Control Information

The Permissions Tag will contain information that may set or control any other aspect of the Programmer/Reader operation including but not limited to enabling or disabling the operating system download function.

Change of Keys

This section describes how the Keys in the tags are changed in the event that the users think the system may have been compromised and they desire to change the Keys.

Change of a Single Tag's User Key 1

In the event that a single User Key 1 being used needs to be changed, changing the Key Maintenance Data in the Tag being programmed will effectively change the User Key 1. This must be deliberately done on a Tag-by-Tag basis.

Change of All Tag's User Key 1's

In the event that the entire set of User Key 1s being used needs to be changed, changing the Algorithm Number (Generator Polynomial), Seed, and/or Clock Count in the Permissions Tags will effectively change the User Key 1s.

To allow changing of Keys, the Users are issued new Permissions Tags. The new Permissions Tags will have any of new Seed, Algorithm Number, and Clock Count information for the User Key 1. The new Permissions Tags will also have Seed, Algorithm Number, and Clock Count information for the User Key 2 which will allow generation of the original User Key 2 programmed at the factory.

The use of the new Permissions Tag will cause the programmer to attempt to use the new User Key 1. If that fails, the Programmer will change to the new User Key 1 using the User Key 2.

This change of User Key 1 process requires a wholesale operation for the changing of all of the keys in all of the Tags in circulation. This requires issuing new Permissions Tags to all users This change of User Key 1 process will appear to happen automatically once the new Permissions Tags have been issued.

It may be determined that a breach of the Security Scheme warrants more severe action. In this case, the entire process may be changed by downloading new code into the Programmer's Flash Memory.

Other Customers' Programmers and Tags

This section describes how the scheme works for the railroads, is not compromised by other programmers not using the scheme, and is not problematic for users not using the scheme.

All Users of Tags containing the SeGo ASIC may utilize the Security Key implementation.

If all users of Tags containing the SeGo ASIC do not utilize the Security Key implementation, then certain systematic constraints must be followed:

1 Universal programmer operational rules must be obeyed.
2 Universal reader operational rules must be obeyed.
3 Universal tag operational rules must be obeyed.

While a preferred embodiment and variations thereon have been disclosed in detail above, those skilled in the art who have reviewed the present disclosure will readily appreciate that other embodiments can be realized within the scope of the present invention. For example, the utility of the present invention is not limited to railroads or to the Trinity ASIC. Also, any suitable algorithm for generating the key K can be used. Therefore, the present invention should be construed as limited only by the appended claims.

What is claimed is:

1. A method for allowing a plurality of users or owners to interact with a transponder, the method comprising:
   (a) providing a reader for accessing the transponder wherein the transponder has a memory with a plurality of protected memory partitions each protected memory partition being associated with its respective user or owner, and a single key for permitting access by any of the users or owners to its respective protected memory partition;
   (b) receiving in the reader a transaction request from any of the users or owners to provide a requesting user or owner and perform a transaction with the transponder; and
   (c) if it is determined that the requesting user or owner is authorized to perform the transaction, the reader performing an algorithm to generate the single key in real time from data contained in the transponder and performing the transaction, whereby access to the protected memory partition of any user or owner by the reader is permitted in accordance with the single key.

2. The method of claim 1, wherein step (c) comprises:
   (i) storing in the reader a list of authorized users or owners and of transactions that each of the authorized users or owners is authorized to perform; and (ii) determining in accordance with the list whether the requesting user or owner is authorized to perform the transaction.

3. The method of claim 1, further comprising:
(i) receiving a capability code in the reader;
(ii) if the capability code is valid, determining that the requesting user or owner is authorized to perform the transaction; and
(iii) if the capability code is not valid, determining that the requesting user or owner not authorized to perform the transaction.

4. The method of claim 3, wherein the capability code has a limited lifetime.

5. The method of claim 3, wherein the capability code is stored in a memory accessible to the reader.

6. The method of claim 1, wherein the reader has permissions information associated with the users or owners and permits access to the protected memory partition of the requesting user or owner in accordance with the permissions information of the requesting user or owner.

7. The method of claim 6, wherein the access to the protected memory partition allows the reader to read data from the protected memory partition and provide the data to the requesting user or owner.

8. The method of claim 6, wherein the access to the protected memory partition allows the reader to write data into the protected memory partition, wherein the data and a request to write the data are obtained from the requesting user or owner.

9. The method of claim 1, wherein permissions information is stored in the reader.

10. The method of claim 9, wherein the permissions information is stored in a permissions tag and the reader obtains the permissions information from the permissions tag.

11. The method of claim 10, wherein the reader obtains the permissions information by reading the permissions tag prior to commencing the receiving of a transaction request.

12. The method of claim 1, further comprising providing a further key within the transponder memory.

13. The method of claim 12, further comprising changing the single key in accordance with the further key.

14. The method of claim 13, wherein changing the single key comprises changing an algorithm number, a generator polynomial, a seed or a clock count.

15. The method of claim 14, wherein the generator polynomial, seed or clock count are located in a permissions tag.

16. The method of claim 1, further comprising providing a master key for protecting configuration data within the transponder memory.

17. The method of claim 1, further comprising changing the algorithm.

18. The method of claim 17, further comprising changing the algorithm by replacing the algorithm with a different algorithm.

19. The method of claim 17, further comprising changing the algorithm by adjusting a generator polynomial of the algorithm.

20. The method of claim 17, further comprising changing the algorithm by adjusting a seeding of the algorithm.

21. The method of claim 1, further comprising storing the single key in the transponder at the time the transponder is manufactured.

22. The method of claim 21, further comprising storing a tag unique ID in the transponder at the time the transponder is manufactured.

23. A reader for allowing a plurality of users or owners to interact with a transponder, the reader comprising:

an antenna for communication with the transponder; and
a processing device, in communication with the antenna, for:
(a) receiving a transaction request from a user or owner and permissions information to provide a requesting user or owner, the transaction request being a request to perform a transaction with the transponder wherein the transponder has a memory with a plurality of protected memory partitions each protected memory partition being associated with its respective user or owner and a single key for permitting access by any of said users or owners to its respective protected memory partition, and determining whether the requesting user or owner is authorized to perform the transaction;
(b) generating the single key in real time by the processing device from data contained in the transponder if the processing device determines that the requesting user or owner is authorized to perform the transaction; and
(c) performing the transaction whereby access to the protected memory partition of any user or owner by the processing device is permitted in accordance with the single key and the permissions information.

24. The reader of claim 23, wherein the processing device stores the permissions information comprising a list of authorized users or owners and of transactions that each of the authorized users or owners is authorized to perform and determines whether the requesting user or owner is authorized to perform the transaction in accordance with the list.

25. The reader of claim 23, wherein the processing device reads a capability code and determines whether the requesting user or owner is authorized to perform the transaction in accordance with the capability code.

26. The reader of claim 25, wherein the capability code is stored in a memory accessible to the processing device.

27. The reader of claim 26, wherein the memory accessible to the processing device comprises a card, and wherein the reader further comprises a slot into which the card is inserted.

28. The reader of claim 23, wherein the reader is configured to read information from the protected memory partition of the requesting user or owner.

29. The reader of claim 23, wherein the reader is configured to write information to the protected memory partition of the requesting user or owner.

30. A system usable by a plurality of users or owners, the system comprising:
a transponder having a memory with a protected memory area having a plurality of protected memory partitions each protected memory partition being associated with its respective user or owner and a single key for permitting access by any of the users or owners to its respective protected memory area; and
a reader comprising:
an antenna for communication with the transponder; and
a processing device, in communication with the antenna, for:
(a) receiving a transaction request from any of the users or owners and permissions information to provide a requesting user or owner and perform a transaction with the transponder, and determining whether the user or owner is authorized to perform the transaction;
b) generating the single key in real time by the processing device from data contained in the transponder if the processing device determines that the requesting user or owner is authorized to perform the transaction; and
c) performing the transaction whereby access to the protected memory partition of any user or owner by the processor device is permitted in accordance with the single key and the permissions information.

31. The system of claim 30, wherein the processing device stores the permissions information comprising a list of authorized users or owners and of transactions that each of the authorized users or owners is authorized to perform and determines whether the requesting user or owner is authorized to perform the transaction in accordance with the list.

32. The system of claim 30, wherein the processing device reads a capability code and determines whether the requesting user or owner is authorized to perform the transaction in accordance with the capability code.

33. The system of claim 32, wherein the capability code is stored in a memory accessible to the processing device.

34. The system of claim 33, wherein the memory accessible to the processing device comprises a card, and wherein the reader further comprises a slot into which the card is inserted.

35. The system of claim 30, wherein the reader is configured to read information from the protected memory partition of the requesting user or owner.

36. The system of claim 30, wherein the reader is configured to write information to the protected memory partition of the requesting or owner.

37. The system of claim 30, wherein the transponder is mounted on a railroad car.

* * * * *